June 26, 1934.  A. E. W. JOHNSON  1,964,583
TRACTOR PLANTER
Filed Sept. 23, 1933
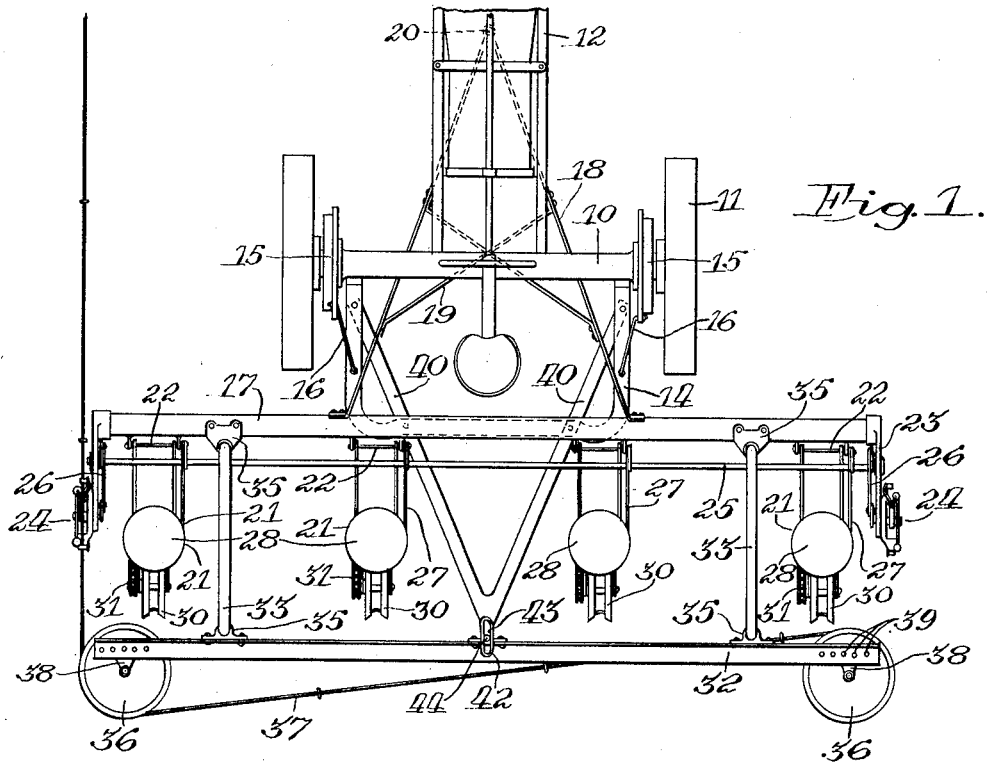
Inventor
Arnold E. W. Johnson
By H. P. Doolittle
Atty.

Patented June 26, 1934

1,964,583

UNITED STATES PATENT OFFICE 1,964,583

TRACTOR PLANTER

Arnold E. W. Johnson, Chicago, Ill., assignor to International Harvester Company, a corporation of New Jersey Application September 23, 1933, Serial No. 690,651

6 Claims. (Cl. 111—48)

The present invention relates to tractor propelled planters and in particular to multiple row check-row planters employing a check-wire.

In tractor planters planting several rows at once, usually four, it has been found desirable, in order to obtain an accurate check, to guide or deflect the check-wire laterally across the path of the planter after it has actuated the checkhead at one side, and deliver it at the other side of the planter in position to be picked up on the return traverse of the field. In order to accomplish this while maintaining the planting units in transverse alignment, it has been found necessary to relieve the planting units of the strains developed from cross guiding the check-wire under tension and to have such strains taken up by the tractor, which, due to its weight and long wheel base, is not swayed or deviated from its line of travel by the side pull of the cross-guided wire. The generic concept involved is disclosed in the co-pending application of Johnson et al, Serial No. 545,974, filed June 22, 1931.

It is the main object of the present invention to provide a rear connected tractor planter, which will have sufficient freedom of movement with respect to the tractor to accommodate itself to variations in the ground surface, with a cross-over wire guide so connected to the planter proper and to the tractor as to transmit all wire strains to the tractor and permit the necessary movements of the planter without itself having any lateral horizontal movement with respect to the tractor, or angular movement about a vertical axis, such as would throw the wire out of check.

The foregoing and other objects and advantages are attained in the preferred form of the invention hereinafter described and illustrated in the accompanying drawing, where, Figure 1 is a plan view of a tractor planter embodying the invention, with the front end of the tractor omitted, and Figure 2 is a side elevation with the tractor shown complete.

The tractor in the combination illustrated is of the well known row crop type comprising a wide tread rear axle structure 10 supported on rear traction wheels 11 and having a central forwardly extending body 12 supported at the front on a narrow tread dirigible truck 13. At the rear of the tractor there is a U-shaped drawbar 14, the arms of which are mounted on the depending side housings 15 of the rear axle structure. The drawbar is held in substantially horizontal position by the suspension links 16 at each side, the upper ends of which are suitably secured to the upper portions of the depending housings 15. The planter frame is shown as positioned above the drawbar 14 and comprises a transversely extended frame member 17 the middle portion of which normally rests on the rear portion of the drawbar and is secured to a forwardly extending draft tongue or frame comprising forwardly converging draft members 18 suitably braced as by cross bars 19 and pivotally connected on a vertical draft pin 20 secured to the under side of the tractor body forward of the axle structure. The planter frame is thus capable of limited lateral movement horizontally to the extent permitted by contact of the rear portions of the draft members 18 with the lower portions of the suspension links 16 which act as stops.

The transversely extended member 17 of the planter frame has connected thereto four equally spaced planting units 21 which may be pivoted on short shafts 22 so that they may have independent vertical movement but no lateral movement. The ends of the planter frame 17 have rearwardly extending bracket arms 23 on which the usual check heads 24 are mounted. Forwardly of the check heads the bracket arms 23 carry bearings for the rock shaft, or check shaft, 25 connected to the usual fork in the check heads by actuating links 26. Other actuating links 27 connect the rock shaft with the dispensing mechanisms in each of the planting units. Each planting unit includes the usual seed hopper 28 and furrow opening runner 29, and is supported on a covering and supporting wheel 30 which also serves to drive the said dispensing mechanism through a chain and sprocket connection 31.

The structure for deflecting the check wire laterally and horizontally across the width of the planter consists of a transversely extending guide member or bar 32 of substantially the same length as the planter frame bar 17. The guide bar 32 is located just back of the planting units and in parallel relation to the bar 17, to which it is pivotally connected by means of pivot arms 33 at each side. The pivot arms 33 are formed with depending pivot portions 34 at each end of considerable length to constitute elongated vertical pivot members respectively received in vertical bearing sleeves 35 secured to the bars 17 and 32. With the long bearings described, the guide bar 32 is supported on the planter frame but can have no vertical movement with respect thereto although relative lateral movement is provided for. At each end of the guide bar 32 there is mounted a wire guide which is preferably a deeply grooved sheave 36 the periphery of which, at the outer side, is located substantially in alignment with the check head 24 and in position to receive the check wire 37 after its passage through the check head. As will be understood from the showing in Figure 1, the wire is trained over the two sheaves in the manner illustrated, to carry the wire from one side of the planter to the other and deliver it there in position to be picked up on the return traverse of the field. The sheaves 36 are mounted under the bar 32 by means of bearing brackets 38 bolted in one of a series of apertures 39 in the end of the bar 32, so that necessary adjustment may be effected, and so that the turn at the headland for the return traverse of the field will serve to automatically release and drop the wire.

As it is essential that the guide bars 32 and the wire guides thereon be at all times maintained in parallel relation to the transversely aligned planter units on the planter frame, and therefore that the strains developed by the check wire be transmitted to the tractor, means is provided for connecting the guide bar 32 to the tractor in such a manner as to prevent any lateral movement of the guide bar with respect to the tractor, while permitting some fore and aft and vertical movement thereof. This means preferably consists of a thrust bar or frame formed of rearwardly converging members 40, the forward portions of which are secured to the under side of the arms and cross piece of the U-shaped draft bar 14 in such manner as to form a rigid rearward extension thereof. The rear portion of the thrust frame is formed to extend upwardly and rearwardly as at 41 (Figure 2) so that it overhangs the central portion of the guide bar 32. At the junction of the arms 40, or apex of the thrust frame, there is a rearward horizontal extension or head 42 formed with a guide-way or slot 43 extending in a fore and aft direction. This slot 43 receives an upright stud 44 on the guide bar 32 which is thereby held against lateral movement but permitted to have some fore and aft movement to accommodate lateral movements of the planter frame.

With the construction described, it will be seen that the guide bar 32 will be maintained in parallel relation to the planter frame and units when lateral movements of the planter frame occur, the guide bar 32 simply moving back and forth as the pivot arms 33 swing laterally with the planter frame. Correct checking relation of the wire is therefore maintained regardless of such movements and all side thrusts developed through the tension of the wire are transmitted to the thrust frame and to the tractor.

The elements of the combination described herein are capable of wide variations in structure without departure from the scope of the invention as defined in the following claims:

1. In a tractor propelled check-row planter, the combination with a tractor of a transversely extended planter frame having a pivotal draft connection with the tractor allowing lateral movement of said frame, a plurality of planting units connected to the frame in laterally spaced relation, a transverse guide bar back of the planter frame, horizontally movable pivot arms connecting the guide bar to the planter frame, a connection between the tractor and the guide bar including means for preventing endwise movement of said bar with respect to the tractor, and check-wire guides mounted on said bar.

2. In a tractor propelled check-wire planter, the combination with a tractor of a transversely extended planter frame having a pivotal draft connection with the tractor allowing lateral movement of said frame, a plurality of planting units connected to the frame in laterally spaced relation, a transverse guide bar back of the planter frame, horizontally movable pivot arms connecting the guide bar to the planter frame, a thrust member on the tractor having a fore and aft extending guideway, an upright stud on the guide bar received in said guideway, and check-wire guides mounted on said bar.

3. In a tractor propelled check-row planter, the combination with a tractor having rear wheels of a transversely extended planter frame behind said wheels having a central draft tongue pivotally connected to the tractor forward of the axis of said wheels, a plurality of planting units connected to the planter frame in laterally spaced relation, a transverse guide bar back of said planter frame and connected thereto for relative lateral movement of the planter frame horizontally, a check-wire guide mounted on each end of said bar, and a thrust frame connecting the guide bar with the tractor including means for preventing lateral movement of said bar with respect to the tractor.

4. In a tractor propelled check-row planter, the combination with a tractor having a wide tread rear axle and traction wheels thereon, of a transversely extended planter frame located immediately behind said wheels and having a central draft tongue pivotally connected to the tractor forward of the axle, a plurality of planting units connected to the planter frame in laterally spaced relation with the outer units located beyond the tread lines of the respective traction wheels, a check-head at each end of the planter frame, a transverse guide bar back of and in parallel relation to the planter frame and extending substantially from end to end thereof, horizontally swingable parallel pivot arms connecting the planter frame to the guide bar, a check-wire sheave at each end of the guide bar in position to receive a wire coming from one check-head and extending across the guide bar to the second sheave, a thrust frame having forwardly diverging arms secured to the tractor at laterally spaced points and having a rear apex portion located directly above the center of the guide bar and formed with a fore and aft slot, and an upright stud on the guide frame engaged in said slot.

5. In a tractor propelled check-row planter, the combination with a tractor of a thrust frame connected to the tractor and projecting rearwardly thereof, a planter frame comprising a transverse member extending across the thrust frame between its front and rear ends and having a forwardly extending draft member centrally secured thereto and pivotally connected at its forward end to the tractor, planter units trailing from the transverse member, spaced horizontally movable pivot arms extending rearwardly from the transverse member, a check-head at each end of the planter frame, a transverse guide bar carried by the rear ends of said pivot arms, a fore and aft movable connection between the guide bar and the rear end of the thrust frame, and a check wire guide mounted on each end of said bar in substantial alignment with the check heads.

6. In a tractor propelled check-row planter, the combination with a tractor of a check-row planter connected thereto for lateral horizontal movement, a check-wire support at the rear of the planter, horizontally and laterally movable connecting means between the support and the planter, means on the support for receiving a check wire from the planter and deflecting it laterally, and connecting means between the tractor and the support including means for preventing lateral movement of the support with respect to the tractor while allowing the support to move in other directions.

ARNOLD E. W. JOHNSON.